Oct. 27, 1953

B. F. HEAL 2,656,783

MOW HAY DRIER

Filed July 8, 1950

INVENTOR
Byron F. Heal
BY
ATTORNEYS.

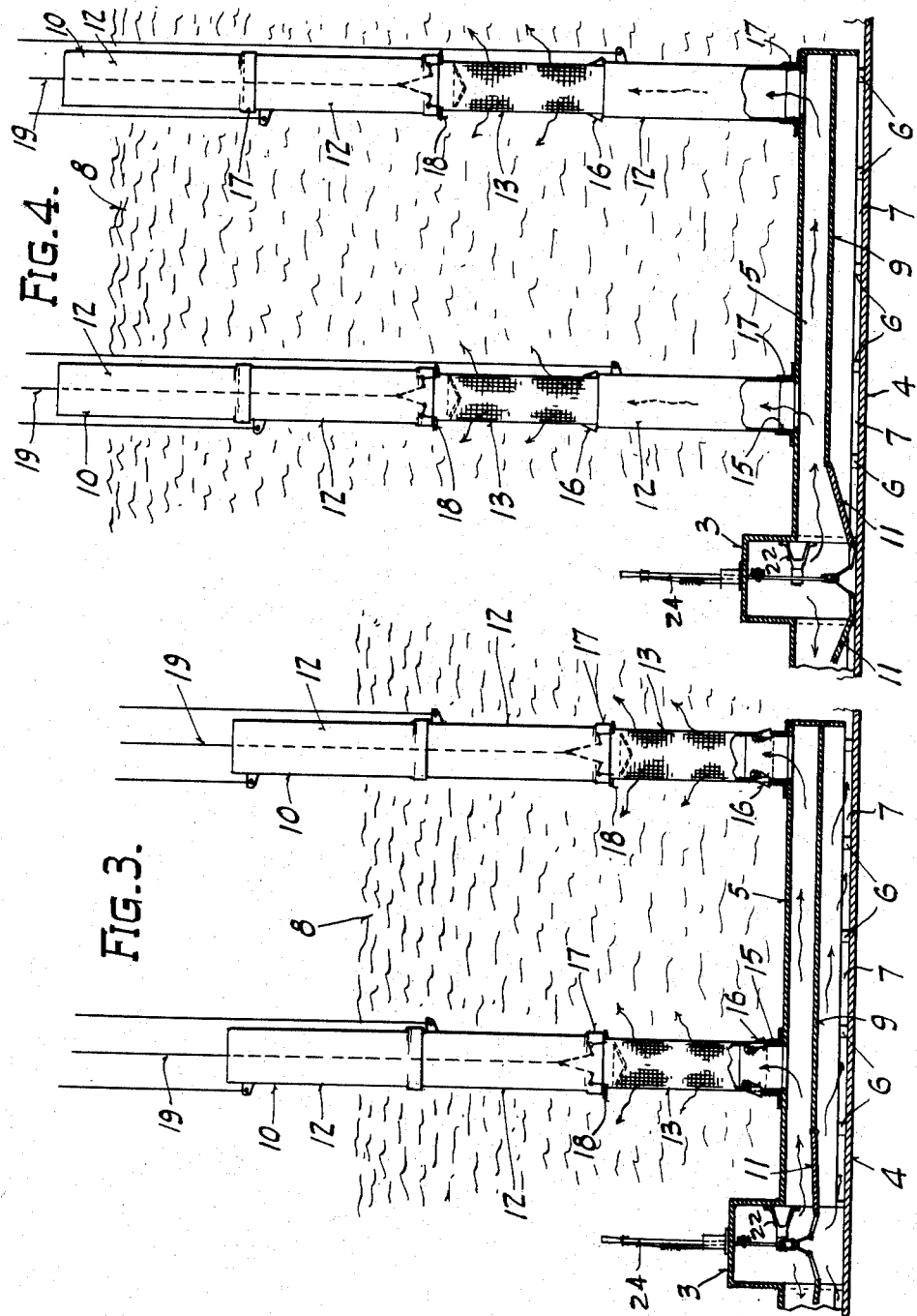

Oct. 27, 1953
B. F. HEAL
2,656,783
MOW HAY DRIER
Filed July 8, 1950
3 Sheets-Sheet 3
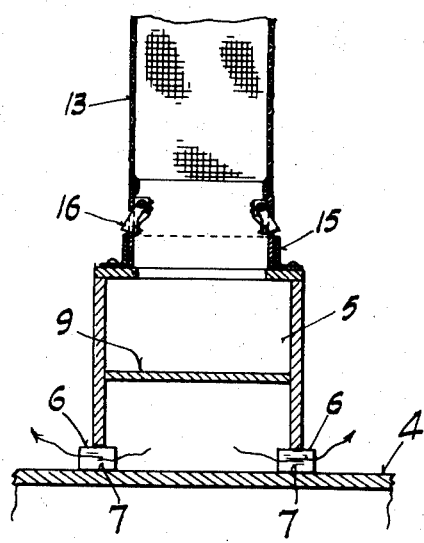
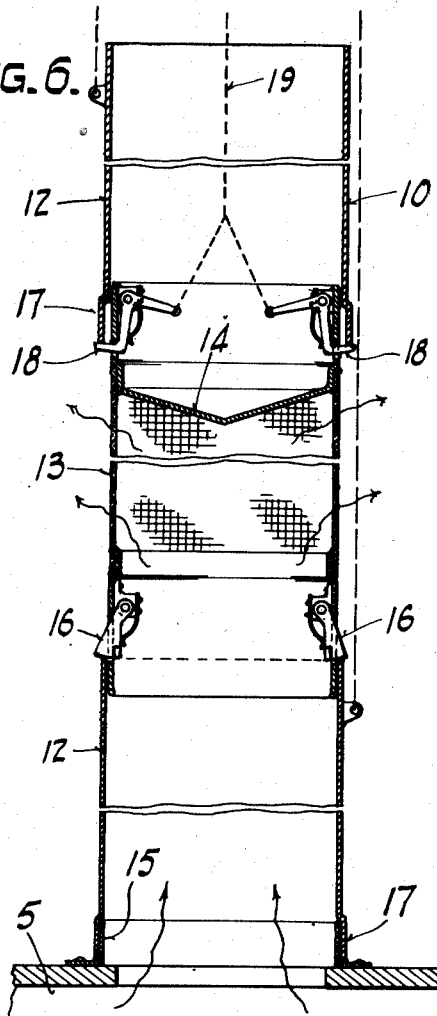
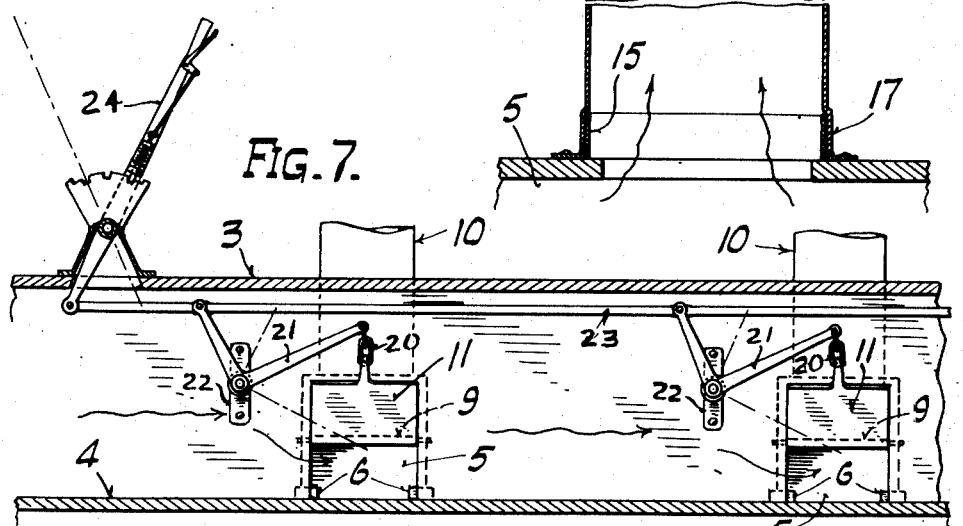
INVENTOR
Byron F. Heal
BY
ATTORNEYS.

Patented Oct. 27, 1953

2,656,783

UNITED STATES PATENT OFFICE 2,656,783

MOW HAY DRIER

Byron F. Heal, Waukesha, Wis.

Application July 8, 1950, Serial No. 172,693

6 Claims. (Cl. 98—56)

This invention relates to a mow hay drier system of the type employing a blower and distributor ducts extending therefrom to the several areas of a hay mow for delivering air into and passing the same through the undried hay.

The distributor ducts generally comprise a large main duct extending the length of the mow along the floor, and a plurality of lateral ducts branching from the main duct and extending at right angles therefrom also along the floor of the mow. The lateral ducts are open at the bottom with the side walls thereof resting on two-by-four cross members which are spaced to provide a side opening for the discharge of air from the ducts into the hay at the floor level.

Mow hay driers have generally been restricted in efficient operation to a depth of hay of about eight feet, whereas usually it is desirable to fill a mow to a depth of twenty feet or more. Attempts have been made to deliver air upwardly from the lateral ducts through open columns in the dried hay to points beneath the incoming fresh hay to be dried, as the mow is being filled. However, since the principal resistance to the flow of air upwardly through the hay is presented by the upper lever of undried hay there was a general permeating of the incoming air throughout the lower dried portion of hay from the floor lever discharge slots in the laterals and from the rising air in the columns referred to, and which had a tendency to overdry the lower portion of hay resulting in a substantial loss in carotene content and food value.

One of the principal objects of the present invention is to prevent overdrying of any portion of the hay.

Another object of the invention is to more effectively distribute the air to the undried portion of the hay in the mow.

Another object is to provide a simple inexpensive duct and column control for selectively discharging the air at any desired location in the mow.

Another object is to prevent the free discharge of air into the dried hay on its passage to the upper level of undried hay.

An embodiment of the structural features of the invention is illustrated in the accompanying drawings in which:

Fig. 3 is a view similar to Fig. 2 showing the construction employed when the hay has reached about seven feet in depth;

Fig. 4 is a view similar to Fig. 3 showing the construction employed when the hay has reached about twelve feet in depth;

Fig. 5 is a detail transverse section through a lateral duct taken on line 5—5 of Fig. 1;

Fig. 6 is an enlarged detail section showing the manner of support of the stack liner sections and the telescoping of the same over the vent section; and Fig. 7 is a longitudinal vertical section through the main duct showing the operating mechanism for the valve flaps.

Figure 1:
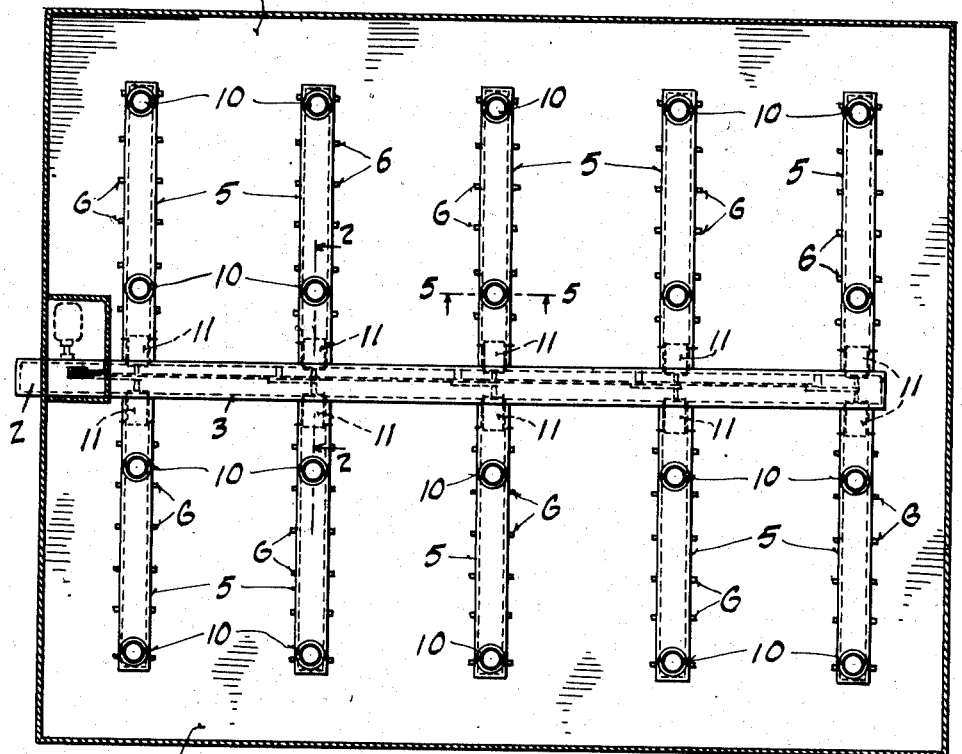
Figure 1 is a top plan view of a mow with the roof removed and showing the ducts prior to filling the mow with hay.

The drier system of the present invention is applicable to any hay mow 1 of substantial depth and employs a large capacity motor-driven fan 2 to supply drying air to the system. The discharge for fan 2 is into a main duct 3, usually constructed of wood and extending along the floor 4 of mow 1 for the full length of the mow.

Air is distributed by duct 3 to lateral branch ducts 5 extending generally at right angles to duct 3 and across the mow 1 along the floor 4. The lateral ducts 5 are spaced generally about five feet apart and each is constructed without a bottom and with its side walls resting on slats 6 to support the duct above floor 4 and provide shallow openings 7 at the floor level along the sides of each duct for the discharge of air into the hay 8.

In order to increase the effective depth of drying without continually and excessively drying the lower portion of the hay, each lateral duct 5 is divided into a lower duct and an upper duct by a partition 9 extending across the same for the substantially full length thereof, and the upper duct is employed to supply air to a plurality of upwardly extending columns or flues 10 extending upwardly through the hay 8.

Figure 2:
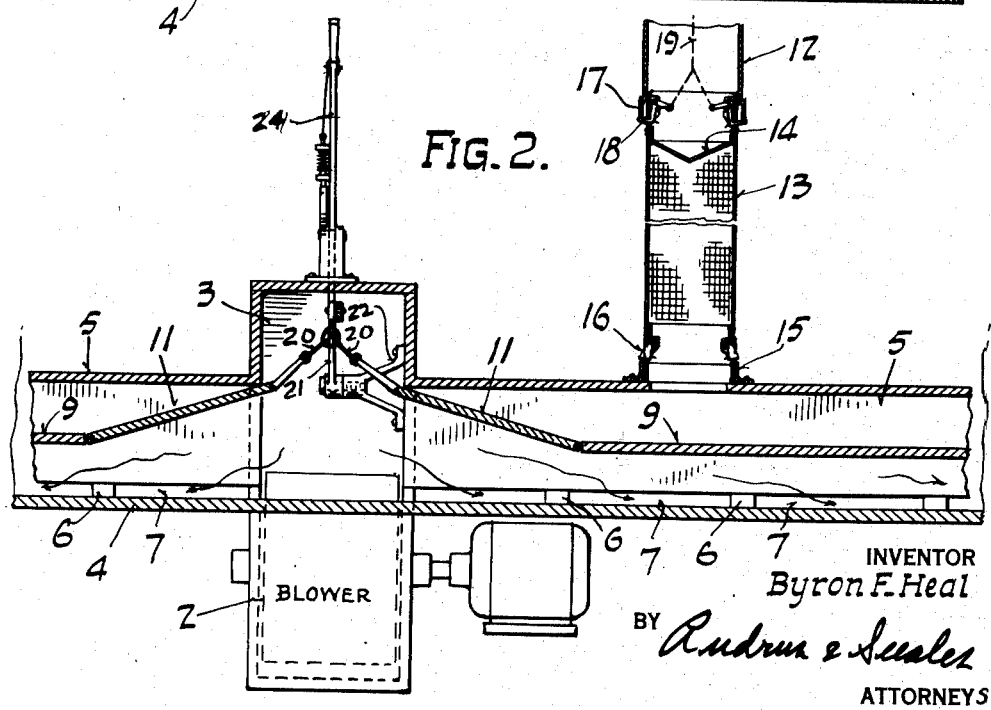
Fig. 2 is a transverse vertical section through the mow taken centrally of one of the lateral ducts on line 2—2 of Fig. 1 and showing an initial filling of about five feet of hay in the mow.

A suitable valve 11, which is shown in the form of a hinged flap, at the forward end of partition 9 at the mouth of each lateral duct 5, is employed to control the flow of air into the upper and lower ducts of the lateral at will. When flaps 11 are raised to their uppermost position, as shown in Fig. 2, air is supplied only to the lower ducts of the laterals 5 and discharged only through openings 7 into hay 8. When flaps 11 are lowered to their lowermost position, as shown in Fig. 4, the air supply is cut off from the lower ducts and is opened to the upper ducts for discharging air upwardly through the flues 10.

Each lateral duct 5 has a plurality of openings in the top thereof spaced about five feet apart along the length of the duct and which supply air to corresponding flues 10.

Each flue 10 comprises a plurality of liner sections 12 formed of sheet metal and an air discharge section 13 formed of a screen grill or perforate metal having a closed top 14, and may be either circular or rectangular in cross section. Preferably each liner section 12 is about three feet in vertical length and the air discharge section 13 is about three feet in vertical length.

Initially, during discharge of air through the openings 7 at the floor level, flap 11 is disposed to prevent discharge of air into columns 10 and the columns are constructed with the air vent sections 13 resting upon the laterals 5 in registry with the corresponding top openings therein, as shown in Fig. 2. Two lengths of liner sections 12 are supported on the upper end of each corresponding section 13 so as to form the hollow columns 10 upwardly through the hay as the latter is discharged into the mow 1 and fills upwardly around the columns.

As the mow 1 becomes filled around the column sections 12 and 13 to a level of two or three feet above the top of open section 13, flap 11 may be lowered, as shown in Fig. 3, to admit air to columns 10 through the upper half of the laterals 5 and the vent sections 13. At the same time air discharge is continued through openings 7 into the hay at floor level until the latter is properly dried.

Thereupon, and as the mow 1 becomes filled to a depth of over four feet above the vent sections 13, the flap 11 is dropped to its lowermost position, as shown in Fig. 4, where it cuts off air supply to openings 7 and directs all of the air upwardly through vent sections 13. When the depth of hay above vent 13 is about seven feet, the first liner section 12 is pushed down over the corresponding section 13 for each column 10 and the vent section is raised to a position between the first and second liner sections, as shown in Fig. 4. Continued filling of mow 1 with corresponding successive adding of liner sections 12 and successive moving of vent section 13 upwardly to maintain the air discharge as a level generally between about three feet and about seven feet below the top of the hay.

By the method of the present invention the air is discharged into the hay only at the level where it is most effective in drying the undried portion of fresh hay, leaving the dried portion of hay free from undesirable continued passage of drying air therethrough. Generally, the rate of drying and the rate of filling of the mow are corelated to provide drying of each foot of depth of hay at about the same rate as that for filling each foot of depth of the mow. It is advisable to maintain a depth of at least about three feet of hay above the discharge level for air in order to obtain an efficient distribution of air through the hay.

The construction of column sections 12 and 13 may vary. As shown, liner sections 12 are slightly larger in section than grill section 13 so that the liner sections can be pushed down over the grill and the latter pulled upwardly through the liner to successive positions. An interlock may be provided between the several sections if desired.

The openings from ducts 5 into the several columns 10 are surrounded by upstanding flanges 15 which encircle the lower end of grill section 13 and enter the subsequent first liner section 12 to locate the same in registry with the opening.

In the construction shown, the lower end of vent section 13 has one or more pivotal latches 16 which are normally spring biased outwardly to support the section on the upper end of the next lower liner section 12. When a liner section 12 is pushed downwardly over section 13, and the latter is pulled upwardly through the liner 12, the latches 16 are pivoted inwardly by ordinary cam action thereon by section 12. When section 13 is raised above section 12 the latches 16 are released and spring outwardly to support the section 13 on the upper end of section 12.

The lower end of each liner section 12 is crimped outwardly to provide a bell end 17 which is telescoped by the upper end of the next liner section to provide a relatively airtight joint between each section and maintain proper alignment of the sections.

The upper liner sections 12 are supported upon the upper end of vent section 13 by means of one or more laterally outwardly extending pivotal latches 18 which are normally spring biased outwardly for the purpose stated. The latches 18 are actuated by a pull cord 19 which extends upwardly from the top of vent section 13 through the upper liner sections 12, and by means of which the vent section 13 is pulled upwardly.

The construction is such as to facilitate manipulation of the several sections in carrying out the process described.

Any suitable construction may be employed for actuating valve flaps 11 for the several lateral ducts 5. In the illustration of Fig. 7 the flaps 11 are hinged at their outer ends, and their free ends which extend into main duct 3 are each suspended by a corresponding link 20 from a bell crank lever 21 pivotally supported on a suitable bracket 22 extending across the inside of duct 3. A longitudinally movable rod 23 is carried on the short arms of bell crank levers 21 and is adapted to be moved longitudinally by a hand lever 24 pivotally secured to one end of the rod and pivotally supported on duct 3.

Various embodiments of the invention may be employed within the scope of the following claims.

I claim:

1. In a mow hay drier, an air distributing duct system comprising a main air duct, a plurality of lateral branch ducts spaced along and extending from said main duct along the floor of the mow, said branch ducts having side openings along substantially the entire length thereof to discharge air into the mow near the floor level on opposite sides of each duct, a corresponding duct substantially coextensive therewith disposed above each branch duct and opening into said main duct to receive air therefrom, each of said upper ducts having spaced upward openings therein for the discharge of air upwardly through columns in the hay, and valve means disposed to control the admission of air from the main duct to said branch ducts and said corresponding upper ducts to cut off the discharge of air into the hay through said floor level openings after the mow has been filled to a predetermined depth and to cut off the discharge of air through said upward openings until the mow has been filled to a predetermined depth.

2. In a mow hay drier, an air distributing duct partitioned longitudinally into coextensive upper and lower channels, a main air supply conduit opening into said channels at one end thereof, discharge openings along substantially the entire length of the sides of said lower channel to discharge air at substantially floor level into the hay in said mow, upward openings from said upper channel disposed to discharge air upwardly through the hay in said mow, and means to open and close the inlet to said channels alternatively whereby air may be admitted to either channel at will or to both channels simultaneously.

3. In a mow hay drier, an air distributing duct partitioned longitudinally into an upper and a lower channel, a main air supply conduit opening into said channels at one end thereof, discharge openings along the sides of said lower channel to discharge air at substantially floor level into the hay in said mow, upward openings from said upper channel disposed to discharge air upwardly through the hay in said mow, means to open and close the inlet to said channels alternatively whereby air may be admitted to either channel at will or to both channels simultaneously, a flue extending upwardly from each upward opening in said duct to form a passage for air upwardly from said duct, means to open said flue laterally at an adjustable predetermined height to discharge air therefrom laterally into the hay, and means to close said flue above the lateral discharge opening therein to force the air outwardly into the hay.

4. In a mow hay drier, a horizontal air distributing duct having a plurality of longitudinally spaced upward openings therein for the discharge of air therefrom, a flue extending upwardly from each said opening to form a passage for air upwardly from the duct, means to open each said flue laterally at an adjustable selected height to discharge air therefrom laterally into the hay in the mow, means to close each said flue above the lateral discharge opening therefor to prevent the escape of air upwardly from the flue, each said flue comprising a plurality of duct sections of sheet metal adapted to fit together at their adjacent ends, and an air discharge perforate section adapted to be positioned initially at the bottom of the flue and thereafter selectively between successive flue sections to provide for raising the level of discharge of air into the hay as the mow is filled.

5. In a mow hay drier, an air distributing duct system comprising at least one duct extending along the floor of the mow, said duct having spaced side openings to discharge air into the mow near the floor level thereof and having spaced upward openings for the discharge of air upwardly through the hay, flue members extending upwardly from said upward openings in said duct to form passages for air upwardly from the duct, means to open each said flue laterally at successive adjustable selected heights to discharge air therefrom laterally into the hay in the mow, and means for selectively controlling the discharge of air into the hay through said floor level openings and flue members, said last named means including means to shut off the supply of air to said side openings whereby discharge through the floor level openings may be cut off when the mow has been filled to a predetermined depth and discharge through the flue members may be prevented until the mow has been filled to a predetermined depth corresponding to a selected level for lateral flue discharge determined by said first named means, and said means being operable to close off the discharge of air at a lower height into the mow to eliminate further drying of the initially stacked hay while later stacked hay is being dried by discharge of air thereto.

6. In a mow hay drier, an air distributing duct system comprising at least one duct extending along the floor of the mow, said duct having spaced side openings to discharge air into the mow near the floor level thereof and having spaced upward openings for the discharge of air upwardly through the hay, flue members extending upwardly from said upward openings in said duct to form passages for air upwardly from the duct, means for selectively varying the height of said flue members whereby the level of discharge of air into the hay through the flue members may be raised as the mow is filled, means for selectively controlling the discharge of air into the hay through said floor level openings and flue members whereby discharge through the floor level openings may be cut off when the mow has been filled to a predetermined depth, and means for controlling the discharge of air into the hay through said flue members whereby discharge may be prevented until the mow has been filled to a predetermined height corresponding to an initially selected level for flue discharge determined by said first named means.

BYRON F. HEAL.

References Cited in the file of this patent

UNITED STATES PATENTS

| Number | Name | Date |
|---|---|---|
| 842,538 | Elward | Jan. 29, 1907 |
| 1,256,677 | French | Feb. 19, 1918 |
| 1,388,328 | Cotton | Aug. 23, 1921 |
| 1,522,186 | Hiestand | Jan. 6, 1925 |
| 1,647,863 | Galbraith | Nov. 1, 1927 |
| 1,686,871 | Meek | Oct. 9, 1928 |
| 1,995,551 | Shodron | Mar. 26, 1935 |
| 2,299,299 | Bills | Oct. 20, 1942 |
| 2,439,722 | Dreisel | Apr. 13, 1948 |
| 2,584,727 | Mellen | Feb. 5, 1952 |

FOREIGN PATENTS

| Number | Country | Date |
|---|---|---|
| 76,284 | Switzerland | May 1, 1918 |
| 175,495 | Switzerland | May 1, 1935 |
| 466,337 | Germany | Oct. 6, 1928 |
| 653,055 | Germany | Dec. 16, 1937 |